Patented Feb. 9, 1926.

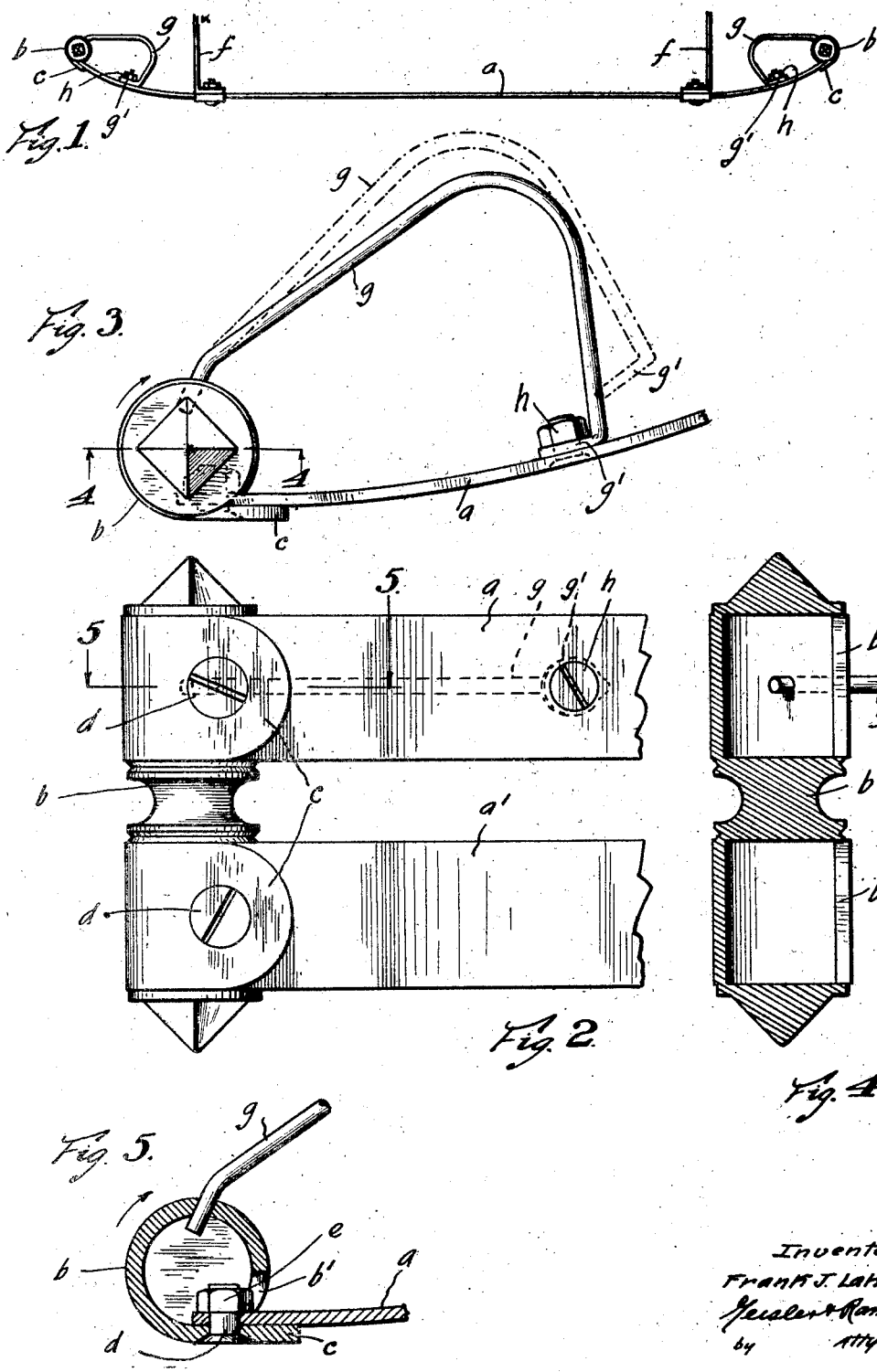

1,572,118

UNITED STATES PATENT OFFICE.

FRANK J. LAHER, OF PORTLAND, OREGON.

BUMPER.

Application filed June 29, 1925. Serial No. 40,314.

*To all whom it may concern:*

Be it known that I, FRANK J. LAHER, a citizen of the United States, and a resident of Portland, county of Multnomah, and State of Oregon, have invented certain new and useful Improvements in Bumpers, of which the following is a specification.

My invention relates to bumpers as commonly employed on automobiles and has for its principal object the providing of a bumper which is of very simple construction and inexpensive to manufacture, easy to assemble and repair, pleasing in appearance and strong and durable in operation, and yet has sufficient resiliency.

A further and incidental object of my invention is to provide a bumper of this character, in which the bumper or impact bars do not have to be formed or upset, under heat. In other words, to provide a bumper, in which the bumper or impact bars do not have to be processed other than being sheared to length, given a slight overall curvature, punched and finished. It is common practice at the present time to construct the bumper bars of flat stock. Said stock is cut to a desired length and the ends are heated and upset, or are formed into eyes; and thus when two or more bumper bars are placed side by side in assembling a bumper they must be held together by bolts and spacers, said bolts passing through said eyes or said spacers placed between or passing about said upset portions. Such forming or upsetting of a bar is a relatively expensive operation, which also affects, somewhat, the alloy steel of which these bumpers are made; all of which undesirable features I avoid by my improvement.

I attain the aforementioned objects by providing a bumper made up of flat, or flatly curved bars which are connected by their ends with a cap or end piece. Said cap or end piece is provided with an elongated slot or if the bumper is made of a plurality of bars, a corresponding number of recesses. Said recesses not only provide a sturdy means of connecting the ends of said bumper bars together and holding them in spaced apart relationship, but also serve to conceal the ends of said bars in such a manner that the sheared ends of the said bars are not necessarily dressed or finished. This manner of connection permits the bars to be sheared to exact length and eliminates the necessity of removing the burr which is formed upon said bars by the shearing operation. I provide a lip adjacent each recess which is adapted to carry the fastening means for connecting said end piece or cap with the bumper bar ends. Said lip is arranged to conceal the adjacent recess and said recess is preferably formed to conceal the threaded end of the bolt which constitutes said fastening means.

A further object of my invention is to provide auxiliary devices on the back side of the ends of the bumper which serve to close the backwardly curved ends of said bumper to prevent articles from being engaged by said "hooked" end. That is, the ends of the bumpers, especially the bumper placed on the front end of the vehicle, ordinarily extend laterally beyond the fenders at each side, and thus often when said vehicle is being backed, one backwardly curved end portion of the front bumper will "hook" a fender or other part of an adjacent vehicle.

To attain this object I mount an auxiliary member, which is curved oppositely to the curve of said bumper end, upon said curved end, said member thus serving to close the otherwise open or "hook"-shaped end of said bumper. In my improved bumper in which the ends of the bumper or impact bars are connected by a separate member bolted thereto said auxiliary member serves an additional purpose, namely, being fastened to said end piece or cap and to one bumper bar, said member prevents the cap from shaking loose under the vibration of the bumper. This is especially true if the auxiliary member is relatively resilient and formed so that said member must be sprung into place. The tendency of said member to assume its normal position tends to rock said cap or end piece about its bolted connection and to pinch the nut thereon to prevent it from being backed off by the vibration of said vehicle.

The above mentioned features of my invention are hereinafter fully described with reference to the accompanying drawings, in which:

Fig. 1 is a plan view of my improved bumper carried by two spaced supports, portions of which are shown;

Fig. 2 is an enlarged fragmentary elevation of one end of said bumper showing the separable end piece for the bumper bars, and shows the auxiliary member in dotted outline;

Fig. 3 is a similar scaled, plan view of the parts shown in Fig. 2;

Fig. 4 is a section taken on the line 4—4 of Fig. 3 through the cap or end piece and shows one end of the auxiliary member which is carried thereby; and Fig. 5 is a plan section taken on the line 5—5 of Fig. 2 and shows the bolted connection between the bumper bar and the cap or end piece, and also one end of the auxiliary member.

My improved bumper comprises a plurality of bumper bars a—a', shown as being two in number in the accompanying drawings. The ends of said bumper bars are connected by a separate cap or end piece b provided with recesses b' corresponding in number to the bumper bars. The ends of said bumper bars are inserted in said recesses and said caps are provided with lips c adjacent said recesses to which the ends of the bumper bars are fastened by bolts d. Said recesses are located so as to conceal the nut e placed upon said bolt and the heads of said bolts are preferably counter-sunk so as to lie flush with the surface of said lip, as shown in Fig. 5. As can be noted in Figs. 1 and 3, the bumper bars are curved backwardly, upon a relatively long radius, at each side of the supports f. Because of the length of the radius of said bars a, they do not have to be heated and thus in making this bumper it is not necessary to heat any part in forming the same, except the auxiliary member g which is relatively small and inexpensive. This is of great importance, not only because the heating and forging of said bars requires considerable time and is therefore expensive, but also because the heat seems to affect the alloy steel, commonly used for making said bumper bars a—a'. By arranging said bumper so that it extends into the recess b' any burr or irregularity caused by shearing said bars is concealed as also is the threaded portion of the bolt and the nut carried thereby.

An auxiliary member g is fastened into said end piece or cap b at one end and the opposite end is formed into an eye g' and fastened to the bumper bar a by a bolt h. Said eye g' if unrestrained will tend to space itself from the bumper bar a. That is, the member g is relatively resilient and is formed so that if it is fastened at one end, the other will be normally spaced from its point of connection. Thus, when said eye is held in place by the bolt h, and the other end fitted into the cap b, the tendency to reflex, rocks the end piece or cap b about the bolt d which connects the same to the bumper bar. This tends to pinch the nut e tightly against the bumper bar so as to prevent it from backing off the threaded portion of the nut d under the vibration of the automobile.

Said auxiliary member g is formed to close the hooked end of the bumper, that is, the bumper bars being curved rearwardly of the automobile, thus forms a hook opening backwardly which normally extends beyond the fender and thus when the car is being backed said hooked end of the front bumper often engages a fender or other portion of an adjacent car. With my auxiliary member g in place, however, said member will tend to deflect said fender or other article away therefrom to prevent it from being engaged.

I claim:

1. In a bumper, in combination with a bumper-bar, an end piece fixed on each end of the bar, said ends and said pieces being provided with registering bolt holes, each of said end pieces being provided with a cavity to receive the adjacent bar-end and with a tangential projection arranged to overlie the front face of the latter.

2. In a bumper, in combination with a bumper-bar, an end piece fixed on each end of the bar, said ends and said pieces being provided with registering bolt-holes, each of said end pieces being provided with a cavity to receive the adjacent bar-end and with a tangential projection arranged to overlie the front face of the latter, and a bolt inserted through said registering holes, a nut threaded on said bolt seated on said rear face.

3. In a bumper, in combination with a bumper-bar, an end piece fixed on each end of the bar, and a guard fixed to the rear face of each end of said bar, said guards consisting of a resilient, bent rod having one of its ends fastened to the rear face of, and at a substantial distance from the end of the bar, and its other end fastened to said end piece, said rod being adapted to tend to rotate the end piece about its longitudinal axis.

4. In a bumper, in combination with a bumper-bar, an end piece fixed on each end of the bar, said ends and said pieces being provided with registering bolt-holes, each of said end pieces being provided with a cavity to receive the adjacent bar-end and with a tangential projection arranged to overlie the front face of the latter, a bolt inserted through said registering holes, a nut threaded on said bolt seated on said rear face, and a guard fixed to the rear face of each end of said bar, said guards consisting of a resilient, bent rod having one of its ends fastened to the rear face of, and at a substantial distance from the end of the bar, and its other end fastened to said end piece, said rod being adapted to tend to rotate the end piece about its longitudinal axis and thus to move said tangential projection of the latter from the underlying bar end, thereby tending to tilt said bolt and thus cause its nut to bind and lock with said bar end.

5. In a bumper, parallel bars, end pieces affixed at the opposite ends of said bars and connecting the latter, each of said end-pieces being of elongate form and provided with interior cavities adapted to receive the adjacent ends of said bars, one side of the walls encompassing said cavities extending tangentially beyond the latter and overlying the front faces of the bar ends.

6. In a bumper, parallel bars, end pieces affixed at the opposite ends of said bars and connecting the latter, each of said end-pieces being of elongate form and provided with interior cavities adapted to receive the adjacent ends of said bars, one side of the walls encompassing said cavities extending tangentially beyond the latter and overlying the front faces of the bar ends, said end pieces and said bar ends being provided with registering bolt holes, and bolts inserted in said registering holes, and nuts threaded on said bolts seated on the rear faces of the bar ends.

7. In a bumper, parallel bars, end pieces affixed at the opposite end of said bars and connecting the latter, each of said end-pieces being of elongate form and provided with interior cavities adapted to receive the adjacent ends of said bars, one side of the walls encompassing said cavities extending tangentially beyond the latter and overlying the front faces of the bar ends, said end pieces and said bar ends being provided with registering bolt holes, bolts inserted in said registering holes, and nuts threaded on said bolts seated on the rear faces of the bar ends, a guard fixed to the rear face at each end of one of said bars, said guards consisting of a resilient rod having one of its ends fastened to said rear face a substantial distance from the end of the bar, and its other end fastened to said end piece, said rods being adapted to tend to rotate said end pieces about their longitudinal axes and thus to move their said tangential projections from the underlying bar ends, thereby tending to tilt said bolts and thus cause their nuts to bind and lock with the bar end.

8. An end-piece for the ends of bumper bars, of the character described, consisting of an integral fitting provided with an interior cavity and an opening leading into the latter, one side of the wall encompassing said cavity extending from said opening a substantial distance tangentially to the longitudinal axis of the end-piece.

9. In a vehicle bumper, a plurality of bumper bars, a cap having a corresponding number of recesses therein adapted to receive the ends of said bars, and a lip adjacent each recess adapted to overlie the bar when arranged in the recess and adapted to carry fastening means for said cap with said bar.

10. In a vehicle bumper, a plurality of bumper bars, a cap having a corresponding number of recesses therein adapted to receive the ends of said bars, a lip adjacent each recess adapted to overlie the bar when arranged in the latter and adapted to carry fastening means for said cap with said bar, said recess being arranged to conceal the fastening means of said cap with said bar.

11. In a vehicle bumper, a plurality of bumper bars, a cap having a corresponding number of recesses therein adapted to receive the ends of said bars, and a flexible auxiliary member fastened to said cap and said bumper bar.

12. In a vehicle bumper, a plurality of bumper bars, a cap having a corresponding number of recesses therein adapted to receive the ends of said bars, a flexible auxiliary member fastened to said cap and said bumper bar, said member being formed normally to space one end thereof from said bumper bar and thus when held, tends to rock said fitting and hold the fastening means in place.

13. In a vehicle bumper, a plurality of bumper bars, an integral cap having a corresponding number of recesses therein adapted to receive the ends of said bars, a lip adjacent each recess adapted to overlie the bar when arranged in the latter and adapted to carry fastening means for said cap with said bar, said recess being arranged to conceal the fastening means of said cap with said bar, a flexible auxiliary member fastened to said cap and said bumper bar, said member being formed normally to space one end thereof from said bumper bar and thus when held, tends to rock said fitting and hold the fastening means in place.

FRANK J. LAHER